(12) United States Patent
Feller

(10) Patent No.: US 6,575,044 B1
(45) Date of Patent: Jun. 10, 2003

(54) TRANSIT-TIME FLOW SENSOR COMBINING HIGH RESOLUTION AND WIDE DYNAMIC RANGE

(76) Inventor: Murray F. Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 10/139,528

(22) Filed: May 6, 2002

(51) Int. Cl.[7] .................................................. G01F 1/66
(52) U.S. Cl. .................................................. 73/861.27
(58) Field of Search ........................ 73/861.27, 861.23, 73/861.28, 861.29

(56) References Cited

U.S. PATENT DOCUMENTS

| 6,178,827 B1 | 1/2001 | Feller |
| 6,370,963 B1 | 4/2002 | Feller |

| 2001/0015107 A1 | * 8/2001 | Feller ...................... 73/861.27 |

* cited by examiner

*Primary Examiner*—Max Noori
*Assistant Examiner*—Takisha S Miller
(74) *Attorney, Agent, or Firm*—David Kiewit

(57) ABSTRACT

A time-of-flight flow sensor, of the type in which a measured phase difference between upstream and downstream acoustic propagations is representative of fluid flow rates, is operated at two distinct frequencies. Operation at a relatively low propagation frequency yields a first phase difference signal that is unambiguously representative of the rate of flow but that has a larger than desired measurement error. Operation at the higher frequency provides a lower measurement error, but may be ambiguous because of the modular nature of phase detectors. The low frequency phase difference signal can be used by a signal processor to determine a compensation term that can be combined with the higher frequency phase difference signal to remove the phase detector ambiguity, if one is present.

16 Claims, 3 Drawing Sheets

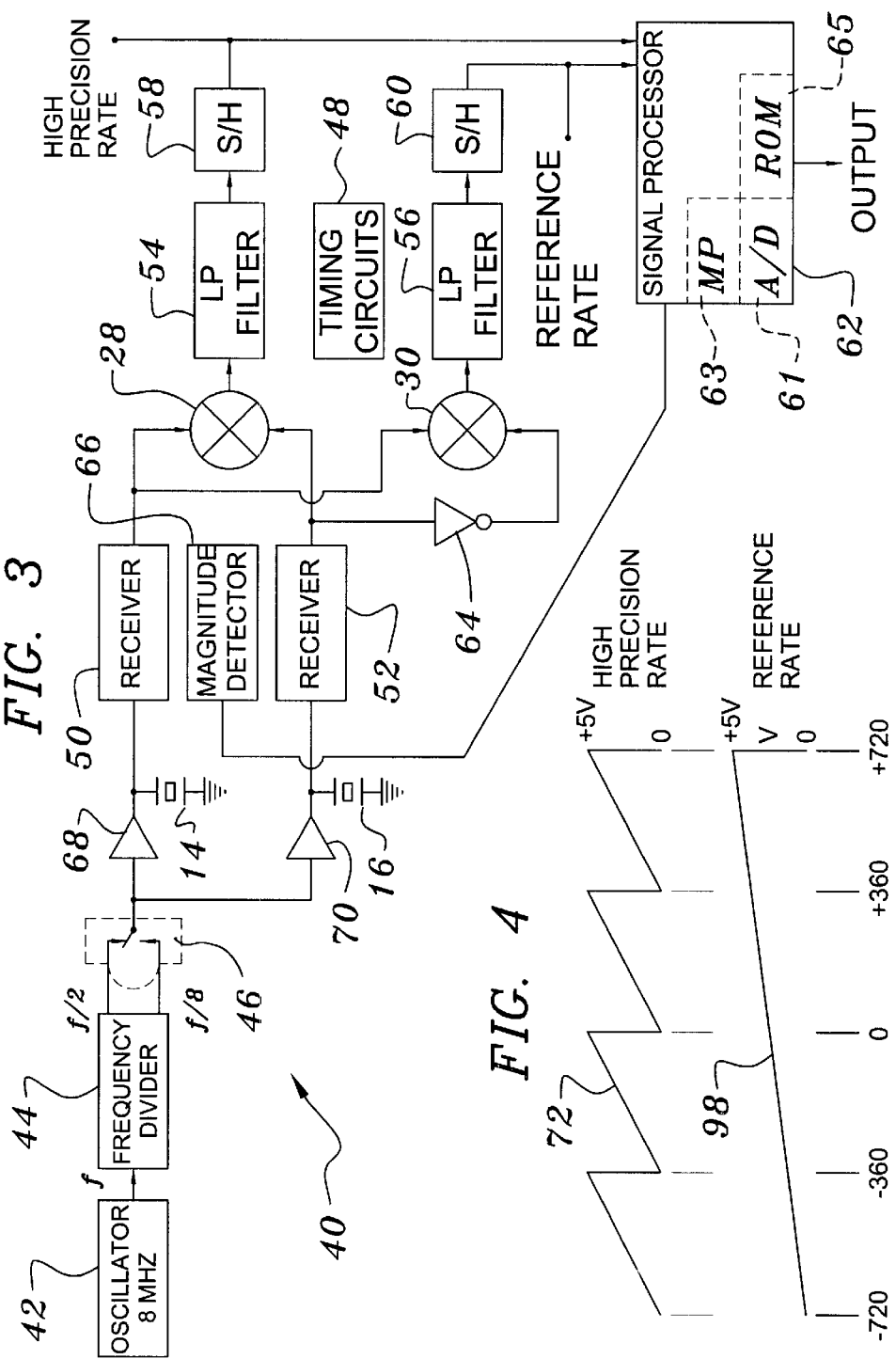

TRANSIT-TIME FLOW SENSOR COMBINING HIGH RESOLUTION AND WIDE DYNAMIC RANGE

BACKGROUND OF THE INVENTION

1. Technical Field

This invention relates to a method for measuring the flow rate of a fluid whereby the propagation times of ultrasonic signals transmitted through the fluid are detected to determine flow rate. The invention further relates to improving the precision of measurement and its, reliability.

2. Background

Ultrasonic transit-time flow sensors, also known as "time-of-flight" ultrasonic flow sensors, detect the acoustic propagation time difference between upstream and downstream ultrasonic transmissions. This time difference, which results from the movement of the flowing fluid, is processed to derive a fluid flow rate. Examples of such flow sensors are found in my U.S. Pat. No. 6,178,827 and U.S. Pat. No. 6,370,963 the disclosures of which are herein incorporated by reference. The sensors described in those references use transit-time difference detection means that phase compare signals at the acoustic propagation frequencies, where the phase angle difference is proportional to the flow rate of the fluid, the distance between the transducers along the flow path, and the frequency. These phase measurement approaches, which may comprise an Exclusive-OR phase detector, are relatively simple and cost-effective but impose a performance limitation on the sensor. For example, the Exclusive-OR phase detector is unambiguous for signal phase shifts only within the range of 0+/−90 degrees. This limitation requires that an acoustic signal frequency and/or distance between the transducers be selected so that the maximum fluid flow rates never produce a greater phase shifts.

Thus, although the measurement precision of the sensor is nominally enhanced by operating at high acoustic frequencies and/or with large distances between the transducers, a clear limitation of the prior art is that of generating an ambiguous flow rate output if either too high a frequency or too great a distance is selected. This is a particular problem in applications in which the maximum flow rate of a range of flow rates is not known in advance of installation so that a measurement system designer is driven to select a lower acoustic propagating frequency or a shorter distance between the transducers than is actually necessary. Using a lower frequency or a smaller transducer spacing disadvantageously uses less of the modular phase response range of the phase detector and thereby reduces the phase shift detection sensitivity, which degrades the measurement precision of the sensor.

Ultrasonic transit-time flow sensors typically operate at acoustic propagation frequencies of several megahertz in order to be able to detect the relatively small time differences produced by flowing fluids. At these frequencies, scale or other forms of fouling on wetted transducer surfaces can severely degrade the efficiency of coupling the acoustic energy between the transducer and the fluid. This degrades the quality of measurement of the sensor or, in extreme cases, causes it to cease functioning altogether. Hence, other problems with prior art time-of-flight flow meters are an inability to detect fouling-induced performance degradation and the lack of a backup measurement capability that can be used until corrective maintenance can be performed.

SUMMARY OF THE INVENTION

A preferred embodiment of an improved time-of-flight flow sensor of the invention selectively operates at two distinct frequencies. Operation at a first, relatively low propagation frequency, yields a first phase difference signal that is within the modular response range of a phase detector and is hence unambiguously representative of any flow rate within a range of specified flow rates, but that is characterized by a first measurement error that is larger than desired. The first phase difference signal is preferably used by a signal processor to determine a compensation term that can be combined with a second phase difference signal, measured at a second, higher, frequency to resolve any phase shift detector ambiguity which may occur at high fluid flow rates. The operating modes are preferably time shared and flow rate output signals corresponding to both modes are provided to the signal processor which normally uses the output signal from the lower frequency mode of operation to determine whether the phase detector output from the higher frequency mode is ambiguous or inverted and if so, make the necessary corrections to the flow rate output signal.

As noted above, over a period of operation of a time-of-flight sensor, accumulations of scale or other fouling can cause deterioration of performance and eventual complete failure by degrading the acoustic coupling between the transducer and fluid. This degradation generally increases with frequency, as does the acoustic loss through the fluid. Hence, sensor operation at the lower of the two frequencies is less prone to fouling-induced degradation. In a preferred mode of operation, a flow sensor of the invention detects the amplitude of the received transducer signal in the high frequency mode and, if that amplitude is below a selected level, uses only the flow rate signal from the lower frequency mode as the basis for the sensor flow rate output signal. In addition, when the lower precision flow rate signal has been selected, a preferred sensor of the invention supplies an additional output indicative of a need for maintenance.

A preferred time-of-flight flow meter of the invention comprises two transducers spaced out along a direction in which fluid flows when the device is in use. This preferred apparatus comprises at least one oscillator for supplying transducer-driving signals at each of at least two distinct frequencies so as to cause each of the two transducers to propagate a respective acoustic signal through whatever fluid is present between them. In some embodiments the sensor comprises a switching circuit for sequentially applying only one of the transducer-driving signals at a time to each of the two transducers. It will be understood, of course, that one could also elect to use separate oscillators for each frequency. In addition, the preferred apparatus comprises at least one receiver circuit that may be time shared for receiving the transmitted acoustic signals at each of the at least two frequencies and at least one phase detector for detecting a respective phase difference between the acoustic signals transmitted in the opposite directions at each of the at least two frequencies. Again, it will be understood that although the preferred apparatus is configured to operate in a switched, time shared mode, one could also elect to use greater numbers of some of the components. The preferred apparatus also comprises a signal processor for comparing the phase differences and selecting one of them for use in determining the rate at which the fluid flows.

In a particular preferred embodiment, the transducers comprise piezoelectric elements mechanically configured and sized to resonate at both of the two selected frequencies. This arrangement provides for efficient coupling of the acoustic energy to the fluid at each frequency.

In preferred methods of operation, the two selected frequencies are integral multiples of each other. As will be made clear in the following detailed description, this is a matter of convenience. All that is required is that the two selected operating frequencies be distinct in the sense of being sufficiently different that for a given transducer-to-transducer spacing and a given maximum directly measurable phase difference, there is at least one choice of fluid flow rate within a selected operating range that leads to a situation in which a measured flow-induced phase difference at the higher of the two operating frequencies corresponds to one of several possible flow rates, while the phase difference measured at the lower frequency yields an unambiguous flow rate.

Although it is believed that the foregoing recital of features and advantages may be of use to one who is skilled in the art and wishes to practice the invention, it will be recognized that the foregoing is not intended to list all of the features and advantages. Moreover, it may be noted that various embodiments of the invention may provide various combinations of the heretofore recited features and advantages of the invention, and that less than all of the recited features and advantages of the invention, may be provided by some embodiments.

BRIEF DESCRIPTION OF THE DRAWINGS

The various advantages of the present invention will become apparent to one skilled in the art by reading the following specification and claims and by referencing the following drawings in which:

FIG. 3 is a block diagram of the functional blocks of electronic circuitry in accordance with a preferred embodiment of the present invention.

FIG. 4. is a graphical representation of the detected phase signals output from the circuit of FIG. 5.

DETAILED DESCRIPTION OF THE INVENTION

Relatively simple embodiments of the invention have been selected for the drawings to explain the related concepts. Those skilled in the art will recognize that other embodiments may also be used.

Figure 1:
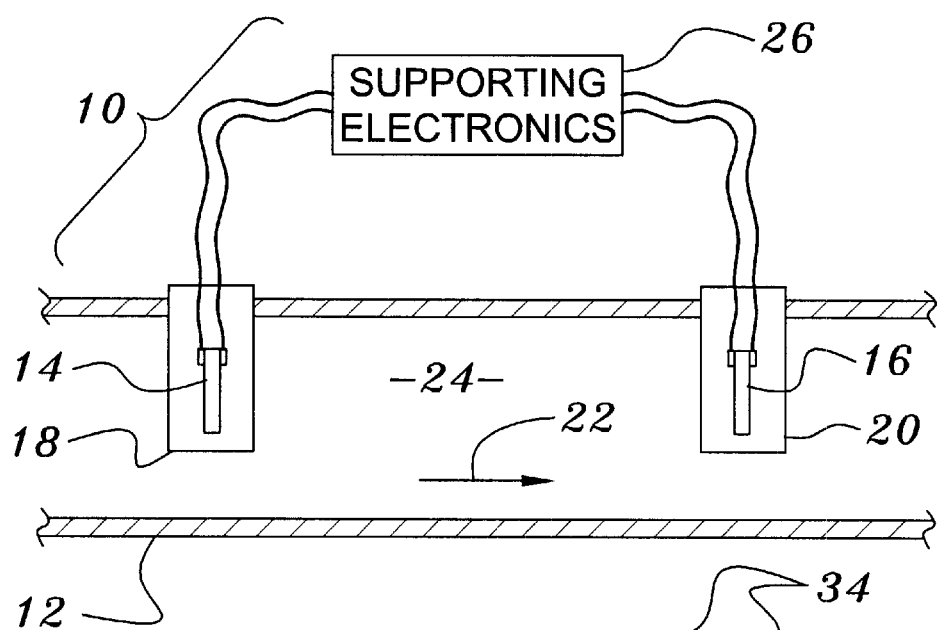
FIG. 1 is a simplified, partly schematic, side view section of an ultrasonic transit-time flow sensor in accordance with a preferred embodiment of the present invention.

Referring to FIG. 1, a simplified ultrasonic transit-time flow sensor 10 is shown mounted in a pipe 12. Two transducers 14, 16. which may be disposed in respective protective housings 18, 20, are used to transmit to and receive acoustic energy from each other along the direction 22 in which a fluid 24 may flow. The electrical signals associated with the transducers are originated by or transmitted to the supporting electronics 26.

The supporting electronics 26 of a transit-time flow sensor 10 use one or more phase detectors to detect a flow-induced difference in the transit-time required for the acoustic energy to travel between the transducers 14, 16. The phase detectors operate at the frequency of the acoustic signals to simplify circuitry and to reduce costs. A convenient form of a phase detector is an Exclusive-OR circuit which is commercially available as a high speed, low cost integrated circuit. Its primary limitation is that it has a 180° phase detection range, outside of which its output slope reverses, and continues to reverse with a triangular pattern every one hundred eighty degrees thereafter. Another convenient form of a phase detector is a flip flop triggered into one state by one of its input signals and returned to its original state by the other input signal. It has a modular response over a 360° phase detection range that repeats with a sawtooth pattern, as depicted in the upper curve of FIG. 4. In either case, as discussed in my Patents No: U.S. Pat. Nos. 6,178,827 and 6,370,693, in prior art transit time flow meters the limited range of phase detection requires that the frequency of transducer operation be low enough to prevent phase differences from exceeding those ranges at the highest flow rate that is to be measured. A relatively low frequency or a shorter acoustic path between transducers spaced along the flow direction must be used in some applications, which reduces the measurement precision. It may also be noted that an acoustic beam between the transducers may be angled with respect to the flow direction and may involve the use of one or more reflecting surfaces as depicted in FIGS. 2a and 2b of my U.S. Pat. No. 6,370,963, the disclosure of which is incorporated herein by reference.

The prior art problem of having to trade off phase detector operating range for measurement precision problem may be overcome by operating the sensor at two different frequencies—e.g., four megahertz and one megahertz. In this arrangement the higher frequency is used to provide the measurement precision by minimizing measurement error, and the lower frequency is used to resolve phase detector ambiguities that can occur at higher flow rates.

Figure 2:
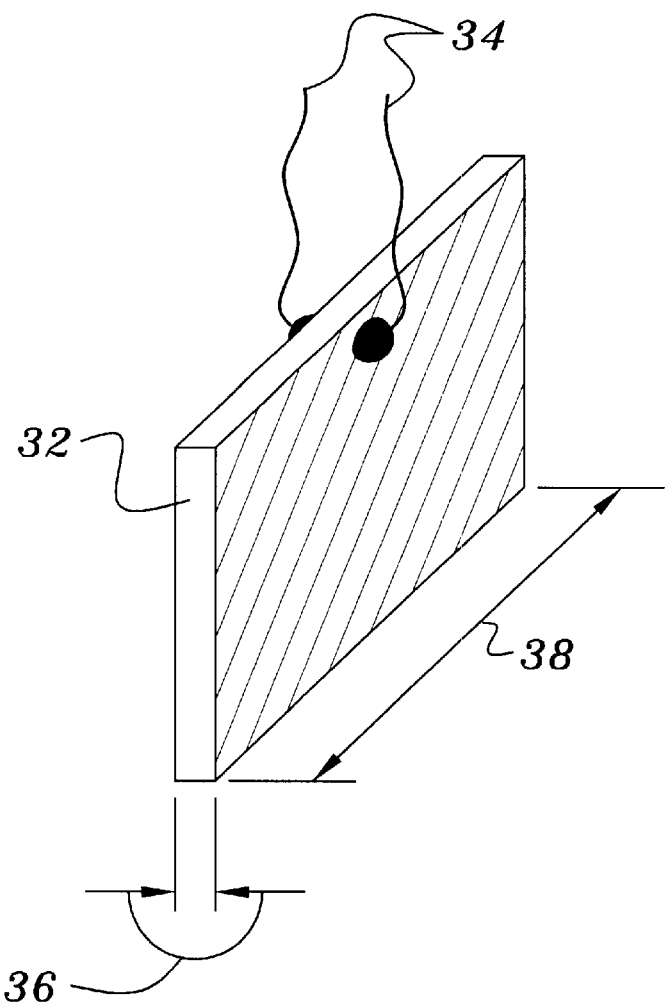
FIG. 2 is an elevational view of a preferred transducer used in the sensor of FIG. 1.

The piezoelectric element 32 depicted in FIG. 2 is an example of a transducer component that is able to operate efficiently at the two selected frequencies. When excited by an alternating voltage applied to its leads 34, the piezoelectric element can resonate in several modes. For example, if the piezoelectric element 32 is chosen to be a lead zirconate titrate ceramic having a thickness 36 of twenty thousandths of an inch and a width 38 of eighty thousandths of an inch, the element will resonate in the thickness mode at about four megahertz and in the width mode at about one megahertz, where the resonant frequencies are essentially inversely proportional to the ratio of the dimensions. Although resonant operation is important with these types of transducers for efficient coupling to a fluid such as water, those skilled in the art will recognize that one can operate a sensor of the invention under non-resonant conditions with suitably responsive transducers having an efficient coupling to the fluid.

FIG. 3 is a functional block diagram of preferred circuitry 40 of the invention. In this circuitry an oscillator 42 generates a signal that is input into a frequency divider 44 having two output frequency signals connected to respective poles of a switching element 46 controlled by appropriate timing circuits 48 are used to selectively connect the signals at one or the other driving frequency through the amplifiers 68, 70 to the transducers 14, 16 in order to produce the acoustic energy. The acoustic signals received by the transducers produce corresponding electrical signals which are amplified by respective associated receivers 50, 52, and that are then input to phase detectors 28, 30, each of which is connected to a respective low pass filter 54, 56 and a respective sample and hold circuit 58, 60. When the higher operating frequency has been selected, the first sample and hold circuit 58 is operated by the timing circuits to provide a high precision rate signal to the signal processor 62. Correspondingly, when the switching element 46 is controlled to select the lower driving frequency, the output from one of the receivers 52 is inverted by an inverter 64 and the phase comparison is made by a second phase detector 30. The output from the second phase detector 30 is routed through the associated low pass filter 56 and detected by the second sample and hold 60 to provide a reference rate signal to the signal processor 62. An additional input to the signal processor 62 is supplied by a magnitude detector 66 that detects the amplitude of the output signal of the receiver 50.

In an operating cycle of a preferred embodiment, the oscillator 42 generates an eight megahertz burst signal which enters the frequency divider 44 to produce corresponding bursts of four and one megahertz signals. Both signal bursts appear at the corresponding poles of the switching element 46. In the high frequency operating mode, the four megahertz signal is selected to be routed through the amplifiers 68, 70 to respective transducers 14, 16 which then simultaneously radiate the corresponding acoustic energy through the fluid 24 to each-other. The electrical signals resulting from the reception of the acoustic energy are amplified by the receivers 50, 52, which supply output signals to a phase detector 28 which has a modular 360° sawtooth response characteristic, as depicted in the upper curve 72 of FIG. 4. This sawtooth waveform repeats as the phase changes through additional cycles of three hundred sixty degrees. The four megahertz carrier components of the output from the phase detector 28 are removed by the low pass filter 54 so that the sample and hold 58 detects what amounts to a DC pulse corresponding in magnitude to the phase difference between the four megahertz burst signals received from the two transducers. The magnitude of the DC signal from the sample and hold 58 is therefore proportional to the fluid flow rate, as long as the actual phase shift is less than the three hundred sixty degree range of the phase detector 28 and the time sequence of the signals into the phase detector 58 is known. If the actual phase shift is greater than three hundred sixty degrees, or the time sequence is unknown, the output from the sample and hold can be interpreted ambiguously as being representative of one of several possible flow rates.

The preferred approach of using a single oscillator having an output that is divided by two different integer values to yield the two operating frequencies provides a highly symmetrical waveform which is better utilized by the other circuitry. Those skilled in the art will recognize that other approaches could be used and that such approaches include, but are not limited to, using two separate oscillators to directly generate the two respective frequencies.

Figure 5:
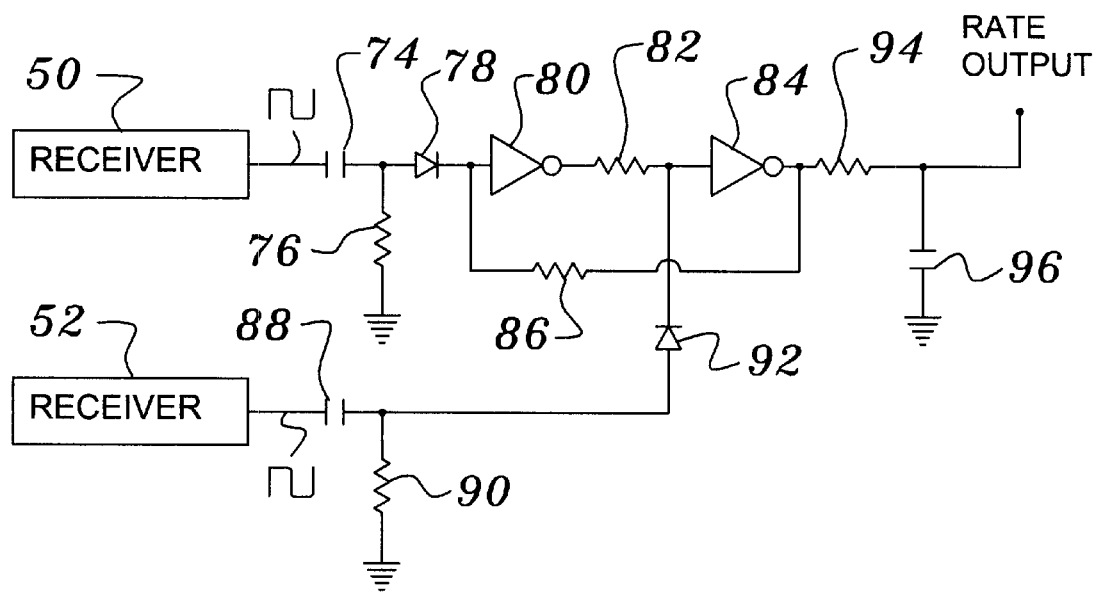
FIG. 5 is a schematic diagram of a preferred electronic phase detector usable in the circuit of FIG. 3.

Preferred phase detectors are of the flip-flop or latch type in which a signal appearing on one input causes the output to go high and an input appearing on the other input causes the output to go low. Over a three hundred sixty degree phase difference between the two input signals, the output duty cycle linearly changes from 0 to 100% and the corresponding DC output waveform is that of a sawtooth. An example of such a phase detector is illustrated in FIG. 5 where receivers 50, 52 provide square wave input signals to the phase detector. A first input capacitor 74 and first resistor 76 form a short time constant differentiating circuit having a positive output that passes through a first diode 78 to a first inverter 80 to make its output signal go low, and through a second resistor 82 to a second inverter 84 to make its output signal go high in a latched state because of the positive feedback provided by a third resistor 86. A second input capacitor 88 and fourth resistor 90 form a second short time constant differentiating circuit whose positive output passes through a second diode 92 to cause the output of the second inverter 84 to go low, thus resetting the flip-flop to its original state. An output resistor 94 and capacitor 96 pair form a low pass filter to smooth the DC output.

In the high precision rate curve of FIG. 4 the sawtooth waveform characteristic is illustrated for a five volt supply. As is known in prior art transit-time flow sensors, at zero flow rate the signals arrive at the phase detector 28 at the same time and therefore there is an uncertainty as to whether the output will be the maximum output corresponding to the top of the sawtooth or the minimum output corresponding to the bottom of the sawtooth, or some intermediate value arising from circuit noise and finite component response time. Signal phase shifts can be introduced to avoid this problem. For example, the output from receiver can be phase shifted one hundred eighty degrees with an inverter so that the phase detector 28 is operating in the middle of its sawtooth at zero flow rate. In another example, the output from a receiver is phase shifted a small amount so that at zero flow rate, phase detector operation is slightly up from zero on the sawtooth, and that increases in flow rate will only be in the direction to increase the phase detector output. However, in either example, as the flow rate is increased, eventually the phase shift will exceed three hundred sixty degrees and the sawtooth will repeat, thereby introducing signal ambiguities which destroy the credibility of the sensor. While a lower operating frequency will prevent this repetition, if used alone, as in the prior art, the lower frequency reduces the precision of the flow rate measurement because the phase difference available for a given flow rate is also reduced.

In order to avoid the prior art dilemma of having to trade precision of measurement for maximum operating flow rate, the invention provides dual frequency operation in which a measurement at a relatively low frequency is used to remove ambiguity from a measurement made at a higher frequency.

In the lower frequency operating mode, the one megahertz signal is selected to be routed through the driving amplifiers 68, 70 and transducers 14, 16, and the received signals are amplified by the associated receivers 50, 52. In this case the output from a second phase detector 30 is utilized with the input from one of the receivers 52 being inverted. The inversion causes the detector to operate at the midpoint of its operating range at zero flow rate, as depicted in the lower curve 98 of FIG. 4. Because that curve 98 does not repeat within the maximum flow rates in each direction, it may be used to resolve any repeating ambiguity associated with the high precision operating mode.

Figure 6:
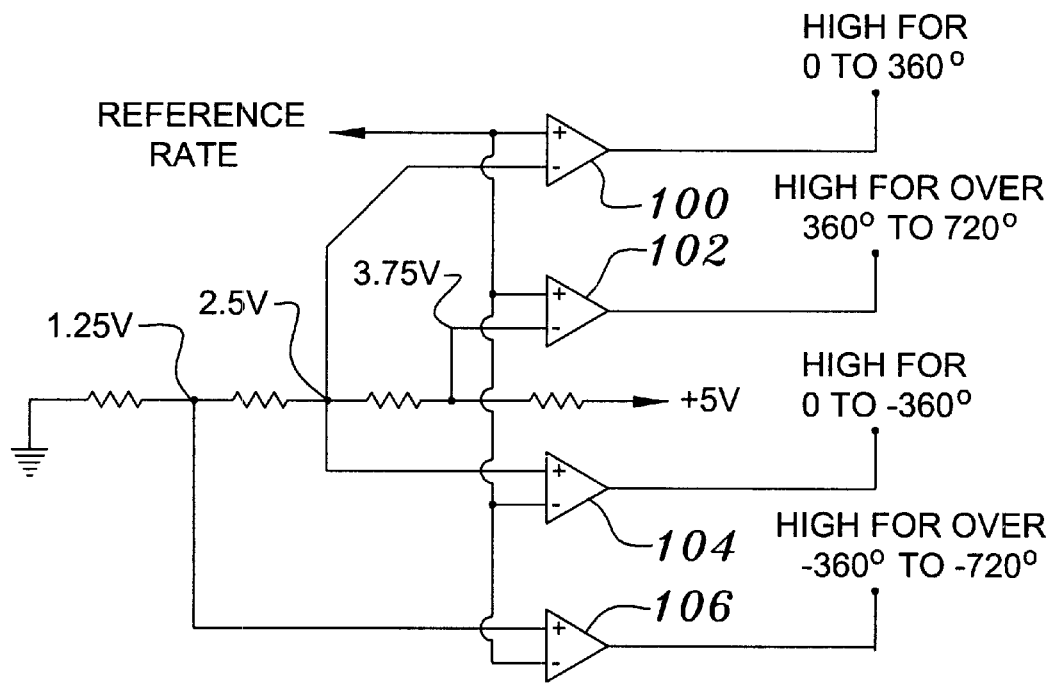
FIG. 6 is a schematic diagram of a hard-wired logic circuit that may be used in a signal processor of the invention.

FIG. 6 illustrates, in accordance with FIG. 4, a preferred hardware embodiment of a portion of the logic circuit in the signal processor, which is connected to the reference rate signal and consists of voltage comparators, and voltage dividing resistors. In the operation of this logic circuit:

A first voltage comparator 100 has its positive input connected to the reference rate signal and its negative input connected to +3.75 volts so as to provide a high output when the signal from the first receiver into the first phase detector leads the signal output from the second receiver signal by between 360 and 720 degrees.

A second voltage comparator 102 also has its positive input connected to the reference rate signal, but its negative input is connected to 2.5 volts so that its output is high when the phase difference between the receiver outputs is positive and between zero and 720 degrees.

A third voltage comparator 104 has its negative input connected to the reference rate signal and its positive input connected to 2.5 volts so that its output is high when the phase difference between the receiving outputs is negative and between zero and −720 degrees.

The fourth voltage comparator 106 also has its negative input connected to the reference rate signal, but its positive input is connected to 1.25 volts so that its output is high when the phase difference is negative and between −360 and −720 degrees.

Thus, a combination of the comparator outputs uniquely defines the one of the four possible modular cycles in which the high resolution flow rate measurement is taking place. This allows the signal processor to make the necessary compensations so as to provide corrected output signals. More generally, the preferred logic circuit has the measured phase difference at the lower frequency and a plurality of reference voltages as inputs and has a plurality of outputs, the combination of which uniquely determines a correction term applied to the phase difference measured at the higher frequency in order to determine the total phase difference at the higher frequency.

Typically, both digital and analog outputs are provided by the signal processor 62. Digital outputs generally have a high capacity of both resolution and span. Analog outputs, which may be more limited, can be expanded as in the following examples: Sensor flow rate operation is initially within a range of flow rates corresponding to the 0 to 360° phase difference range in the high frequency mode during which time the signal processor supplies an analog output of 0 to +5 volts (i.e., that span being the rail to rail voltage difference). Should the flow rate increase beyond that range, the incremental increase would then become the variable output signal and a second output signal would be provided indicating that the first increment of flow rate, corresponding to 5 volts, had been achieved. In a second example, the signal processor 62, sensing that the third or fourth voltage comparators have high outputs, must invert the high precision rate signal for it to correspond directly to a flow rate and either provide a negative going signal with increasing flow rate or another output signal indicative of flow rate in the opposite direction. The dynamic range of the analog output signal is thereby greatly extended and flow direction determined.

Those skilled in the signal processing arts will recognize that other types of phase detectors, such as the Exclusive-OR type discussed earlier in this disclosure, may have different operating ranges (e.g., a plus or minus ninety degree phase range over which no ambiguity occurs) that may call for more or fewer ambiguity resolving comparator outputs. Moreover, although a hardwired logic comparison circuit may be preferred for some embodiments of the invention, it will be recognized that the signal processor may optionally comprise an A/D 61 converter for performing level conversions, and a microprocessor 63 operating under control of a program stored in ROM 65 to provide the necessary comparisons by software means.

Thus, generally speaking, a method of the invention comprises the steps of operating a time-of-flight flow sensor 10 at both a relatively low and a relatively high frequency in order to detect respective phase differences representative of the flow rate. A characteristic of the time-of-flight flow sensor is a phase detector having a modular output. That is, the output signal is uniquely associated with each phase difference within the modulus of the phase detector. As noted above, an Exclusive-OR detector has a modulus of one hundred eighty degrees (i.e., −90° to +90°), and a flip flop has a modulus of three hundred sixty degrees. Whatever the modulus of the phase detector may be, if the total phase difference exceeds the modulus, the phase detector provides an ambiguous output signal modulo its modulus. Thus, operation at the relatively high frequency provides a relatively high precision phase difference comprising a modular offset. Operation at the relatively low frequency, on the other hand, provides a relatively low precision phase difference measurement that is uniquely representative of a fluid flow rate and that can be used to provide a correction term representative of the integral number of moduli of phase offset that are to be added into the indicated high frequency phase difference in order to obtain a total high frequency phase difference.

A preferred signal processor also uses the output signal from the magnitude detector to determine that maintenance is required. As noted previously, fouling-induced problems tend to be worse at higher operating frequencies, hence, in the event the magnitude of the received signal is below a selected preset amount, which is considered the minimum for reliable operation at the higher frequency, the processor will use the lower frequency flow rate signal as a temporary output signal. In addition, the preferred signal processor also provides another signal to indicate the need for maintenance.

In the embodiments discussed in detail herein, both the higher and lower frequency modes of operation can time share the transducers and most of the electronic circuitry. In other embodiments, one could choose to use amplifiers having linear characteristics to provide the signals at both operating frequencies at the same time. In this case, there would be no need to time share the circuitry, and the switching element depicted in the drawing could be omitted. Those skilled in the art will recognize that the dual frequency operation taught in this disclosure can also be implemented by apparatus in which the higher and lower frequency modes of operation are carried out by separate hardware.

The preferred 4:1 ratio between the high precision rate and reference rate signals is convenient and practical. Those skilled in the art will recognize that this ratio could be increased dramatically in order to increase measurement precision at low flow rates. Moreover, the method and apparatus of the invention are useable with more than two distinct frequencies. For example, one could configure a piezoelectric element having three resonant modes of operation by appropriate selection of the thickness, length and width of the element and thereby readily provide apparatus of the invention for use at three distinct operating frequencies.

What is claimed is:

1. An acoustic time-of-flight flow sensor for determining a flow rate, within a range of flow rates, at which a selected fluid flows along a line, the sensor comprising two transducers spaced apart along the line and at least one phase detector for measuring at least two phase differences between acoustic signals transmitted in opposite directions along the line between the two transducers, the phase detector having a modular response range characterized by a modulus, the flow sensor comprising:

at least one oscillator for supplying transducer-driving signals at each of at least two distinct frequencies selected so that when the sensor is operated the at least one phase detector measures at least a first phase difference at a lower of the at least two frequencies, the lower frequency lying within the modular response range for all flow rates within the range of flow rates, and a second phase difference at the higher of the at least two frequencies, the second phase difference exceeding the modulus; and a signal processor for determining, from the phase difference measured at the lower of the at least two distinct frequencies, a correction term which, when combined with the second phase difference measured at the higher of the at least two frequencies, provides a corrected phase difference representative of the rate at which the fluid flows.

2. The flow sensor of claim 1 wherein at least one of the two transducers comprises a single piezoelectric element configured to resonate at both of the at least two frequencies.

3. The flow sensor of claim 1 wherein the signal processor comprises a logic circuit having the phase difference measured at the lower of the two frequencies as an input, the logic circuit having a plurality of outputs, a combination of which determines the correction term.

4. The flow sensor of claim 1 wherein the signal processor comprises a microprocessor operating under control of a stored program to determine the correction term from the phase difference measured at the lower frequency.

5. A method of operating a time-of-flight flow sensor for measuring a rate at which a fluid flows along a path which two transducers are spaced apart, the time-of-flight flow sensor comprising a phase detector having a modular range of response, the method comprising the steps of:

operating the two transducers at a first, relatively low, selected acoustic frequency to obtain a first phase difference signal within the modular range of response and thereby unambiguously representative of the rate of flow, the first phase difference signal comprising a first measurement error;

determining, from the first phase difference and the first selected frequency, a correction term representative of a modular ambiguity in a second phase difference signal obtained at a second selected frequency that is higher than the first selected frequency;

operating the two transducers at the second selected frequency to obtain the second phase difference signal comprising the modular ambiguity and a second measurement error smaller than the first measurement error;

combining the second phase difference signal with the correction term to remove the modular ambiguity therefrom and to thereby determine the rate of flow.

6. The method of claim 5 wherein each of the transducers comprises a single piezoelectric element resonant at both the first and the second selected frequencies.

7. The method of claim 5 wherein the modular range comprises a phase range of three hundred sixty degrees.

8. The method of claim 5 wherein the correction term comprises an integer representative of a number of moduli of offset and the step of combining the second phase difference signal with the correction term comprises addition.

9. The method of claim 5 wherein the higher selected frequency is an integral multiple of the lower selected frequency.

10. The method of claim 5 wherein the steps of operating the two transducers at the first and at the second frequencies are carried out simultaneously.

11. The method of claim 5 wherein the steps of operating the two transducers at the two frequencies are carried out in a time-shared fashion.

12. A method of detecting fouling in a time-of-flight flow sensor comprising two transducers spaced out along a fluid flow path, the method comprising the steps of:

operating the two transducers at a first selected acoustic frequency to obtain a first phase difference signal unambiguously representative of a rate of flow;

operating the two transducers at a second selected frequency that is higher than the first selected frequency to obtain a second phase difference signal also representative of the rate of flow;

comparing an amplitude of the second phase difference signal to a selected level;

if the amplitude is greater than the selected level, using the second phase difference signal for determining the rate of flow; and if the amplitude is not greater than the stored value, using the first phase difference signal for determining the rate of flow.

13. The method of claim 12 further comprising a step of supplying an output indicative of the presence of the fouling if the amplitude is not greater than the selected level.

14. The method of claim 12 wherein the steps of operating the two transducers at the first and at the second frequencies are carried out simultaneously.

15. The method of claim 12 wherein the steps of operating the two transducers at the two frequencies are carried out in a time-shared fashion.

16. The method of claim 12 wherein at least one of the transducers comprises a single piezoelectric element resonant at both the first and the second selected frequencies.

* * * * *